United States Patent [19]

Baviere et al.

[11] Patent Number: 4,686,053

[45] Date of Patent: Aug. 11, 1987

[54] MICELLAR SYSTEMS CONTAINING N-ACYL N-ALKYL α-AMINO-CARBOXYLIC COMPOUNDS, PARTICULARLY USEFUL IN ENHANCED HYDROCARBON RECOVERY

[75] Inventors: Marc Baviere, Noisy Le Roi; Bruno Durif Varambon, Vienne, both of France

[73] Assignee: Institut Francais du Petrole, Rueil-Malmaison, France

[21] Appl. No.: 725,729

[22] Filed: Apr. 22, 1985

[30] Foreign Application Priority Data

Apr. 20, 1984 [FR] France ................ 84 06279

[51] Int. Cl.$^4$ ............................. E21B 43/22
[52] U.S. Cl. ................ 252/8.554; 166/273; 166/275
[58] Field of Search ............ 252/8.55 D; 166/275, 166/273

[56] References Cited

U.S. PATENT DOCUMENTS

| | | | |
|---|---|---|---|
| 2,047,069 | 7/1936 | Hentrich et al. | 252/357 X |
| 3,373,809 | 3/1968 | Cooke | 166/273 |
| 3,469,630 | 9/1969 | Hurd et al. | 252/8.55 X |
| 3,508,611 | 4/1970 | Davis et al. | 252/8.55 X |
| 3,981,361 | 9/1976 | Healy | 252/8.55 X |
| 4,264,515 | 4/1981 | Stern et al. | 562/450 X |
| 4,265,308 | 5/1981 | Hedges et al. | 252/8.55 X |
| 4,404,109 | 9/1983 | Tellier et al. | 252/8.55 |

FOREIGN PATENT DOCUMENTS 2395252 1/1979 France .

Primary Examiner—Herbert B. Guynn
Attorney, Agent, or Firm—Millen & White

[57] ABSTRACT

In the preparation of miceller systems for enhanced hydrocarbon recovery, surfactants are used which consist of N-acyl N-alkyl-α-amino-carboxylic compounds. The considered products comply with the general formulas:

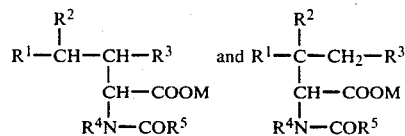

wherein at least one of $R^1$, $R^2$ and $R^3$ is a saturated or unsaturated $C_1$-$C_{22}$ aliphatic hydrocarbon radical (one of them having optionally a carboxylic group) the other or others being a hydrogen atom, $R^1$, $R^2$ and $R^3$ having together from 4 to 22 carbon atoms, $R^4$ is an alkyl radical of 1-5 carbon atoms, $R^5$ an alkyl radical of 1-12 carbon atoms and M is an alkali or alkaline-earth metal, ammonium or a quaternary ammonium group.

As used in the formation of micellar systems (aqueous solutions, emulsions or mirco-emulsions) for enhanced oil recovery, these surfactants have improved performances, particularly, in field waters of high polyvalent ion ($Ca^{++}$ and $Mg^{++}$) content, within relatively wide temperature and pH ranges.

9 Claims, No Drawings

MICELLAR SYSTEMS CONTAINING N-ACYL N-ALKYL α-AMINO-CARBOXYLIC COMPOUNDS, PARTICULARLY USEFUL IN ENHANCED HYDROCARBON RECOVERY

The invention concerns the use in enhanced oil recovery of N-acyl N-alkyl α-amino carboxylic compounds. More particularly, compounds of this type are used as surfactants in the preparation of micro-emulsions or of micellar solutions used in enhanced oil recovery.

BACKGROUND OF THE INVENTION

Many types of surfactants have been proposed in the prior art for enhanced oil recovery. For reasons of cost and availability, the most used surfactants are of the sulfonate type, more commonly particularly petroleum sulfonates, available as alkali metals or ammonium salts. The use of these surfactants is satisfactory as long as the salt content of water does not exceed about 30 g/l (of sodium chloride equivalent), this value being given as an order of magnitude: particularly, the interfacial tensions between oil and sulfonate solutions, obtained by a judicious selection of the product characteristics, are vey low, of the order of $10^{-3}$ mN/m, or even less. But, when the salt content substantially exceeds the above-mentioned value, it has been observed that the interfacial properties of the sulfonates are quickly reduced as the content of divalent cations, calcium and magnesium in particular, is higher. Moreover, the high sensitivity of the sulfonates to divalent cations produces, during the progress of the the surfactants solution through the reservoir, precipitation phenomena and/or transfer of surfactant into a stationary phase, which phenomena, in relation with cation release from the rock, tends to make the surfactant inoperative.

It has been proposed to replace petroleum sulfonates with other anionic surfactants: for example paraffin-sulfonates, olefin-sulfonates, alkyl-sulfates, alkyl-phosphates, alkanoates, ethoxylated fatty alcohol and ethoxylated alkylphenol carboxylates, sulfates and sulfonates, etc. as well as non-ionic surfactants: for example ethoxylated fatty alcohols, ethoxylated alkylphenols, etc.

However, these surfactant substitutes for petroleum sulfonates are subject to a substantial loss of interfacial efficiency when the salt content of the field waters is high. The non-ionic surfactants are much less sensitive than the anionic surfactants to the presence of divalent cations, as far as the precipitation liability is concerned, however, they have the major disadvantage that their properties, when in solution, are very sensitive to small temperature variations. Moreover, the distribution of this type of products (distribution in relation with the polydispersity) between the various liquid phases is such that it results in a decrease of its useful concentration in the solution.

The various disadvantages from which the above-mentioned usual surfactants suffer have led to a search for other surface-active compounds whose surface activity is not substantially affected by the presence of polyvalent cations within large pH and temperature ranges.

It has thus been recommended to use N-acyl α-amino-carboxylic compounds as surfactants in the preparation of micellar systems for enhanced oil recovery. Thus, the French Pat. No. 2 440 773 and the first patent of addition thereto No. 2 468 402 describe the use of compounds complying with the general formula

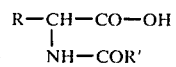

wherein R and R' are aliphatic radicals, R containing from 6 to 32 carbon atoms or more (e.g. up to 120) and R'1 to 18 carbon atoms. It is indicated that these compounds are used as salts formed with alkali metals (also optionally with alkaline-earth metals) and with primary, secondary or tertiary amines. Specific compounds used in prior documents are: sodium N-acetyl α-amino-tetradecanoate, sodium N-acetyl α-amino hexadecanoate, sodium N-acetyl α-amino octadecanoate, sodium N-acetyl α-amino tetracosanoate.

The corresponding salts of potassium, ammonium or of propylamine are also mentioned, as well as:

sodium N-propionyl α-amino hexadecanoate
magnesium N-butyryl α-amino hexadecanoate
ammonium N-propionyl α-amino eicosanoate
potassium N-butyryl α-amino triacontanoate and the compound of formula:

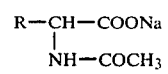

wherein R is a propylene oligomer containing about 20 units of $CH_3—CH=CH_2$.

SUMMARY OF THE INVENTION

It has now been discovered that the use of compounds of N-acyl N-alkyl α-amino carboxylic type, i.e. which essentially differ from the preceding ones by the presence of an alkyl radical on the nitrogen atom, results in a substantial improvement in the performance of the resultant micellar systems, particularly in regard to polyvalent cations, over the usable temperature and pH ranges.

As a general rule, the N-acyl N-alkyl α-amino carboxylic compounds considered in this invention are selected from those described in the French Pat. No. 2 395 252, filed by the same applicant, but wherein the nitrogen atom is essentially tertiary. They comply more particularly with one of the two following formulas:

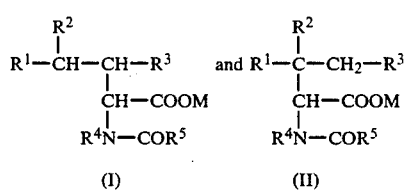

wherein at least one of symbols $R^1$, $R^2$ and $R^3$ is a saturated or unsaturated aliphatic hydrocarbon radical, containing for example 1–22 carbon atoms, the one or more remaining $R^1$, $R^2$ and $R^3$ being a hydrogen atom, $R^1$, $R^2$ and $R^3$ containing together 4 to 22 carbon atoms; $R^4$ is an alkyl radical of 1–5 carbon atoms, preferably methyl, $R^5$ is an alkyl radical of 1–12 carbon atoms, preferably methyl, and M is an alkali or alkaline-earth metal, ammonium or a quarternary ammonium group (preferably sodium or potassium).

Compounds of formulas (I) or (II) wherein one of the symbols $R^1$, $R^2$ and $R^3$ represents an aliphatic radical, as above-defined, substituted with a carboxylic group, for example as the acid, but preferably as a sodium or potassium salt, are also contemplated.

Specific examples of N-acyl N-alkyl α-amino-carboxylic compounds such as above defined are:
sodium N-acetyl N-methyl α-amino octanoate
ammonium N-acetyl N-propyl α-amino octanoate
sodium N-lauryl N-methyl α-amino dodecanoate (with lauryl=$C_{11}H_{23}$—CO—)
sodium N-acetyl N-methyl α-amino tetradecanoate
sodium N-butyryl N-methyl α-amino eicosanoate, and sodium
N-acetyl N-methyl α-amino docosanoate, tetracosanoate and hexacosanoate, used separately or as mixtures.

Other suitable compounds are those where the part

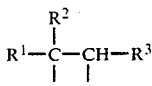

derived from an unsaturated carboxylic acid: 9-octadecenoic acid (oleic acid), 9,12-octadecadienoic acid (linoleic acid), 9,12,15-octadecatrienoic acid (linolenic acid) or 13-docosenoic acid (erucic acid), these acids being used as salts of alkali or alkaline-earth metals, ammonium or a quaternary ammonium group, preferably as sodium or potassium salts. $R^4$ and $R^5$ each represents more particularly methyl radicals.

The N-acyl N-alkyl α-amino carboxylic compounds contemplated in this invention may be prepared in various manners, more particularly according to the process disclosed in the French Pat. No. 2 395 252, wherein a compound with an ethylenic unsaturation is reacted with an amide, hydrogen and carbon monoxide, in the presence of a cobalt catalyst.

In view of the definition of the products of formulas (I) and (II), the starting compounds for their manufacture, according to this process, are, in addition to hydrogen and carbon monoxide:
at least one compound with ethylenic unsaturation of general formula $R^1$—$CR^2$=CH—$R^3$; and
at least one amide of general formula $R^5CONHR^4$, wherein $R^1$, $R^2$, $R^3$, $R^4$ and $R^5$ are defined as above.

Examples of compounds with ethylenic unsaturation are linear or branched, internal or α-olefins, containing 2 to 68 carbon atoms and more particularly 6 to 24 carbon atoms or more.

Examples of advantageous linear α-monoolefins are: n-1-hexene, n-1-octene, n-1-decene, n-1-dodecene, n-1-tetradecene, n-1-hexadecene, n-1-octadecene, n-1-eicosene, n-1-docosene, n-1-tetracosene, as well as their mixtures, particularly the mixtures of α-monoolefins having 20 to 24 carbon atoms.

Fatty acids with an unsaturated aliphatic chain, derived particularly from vegetable or animal greases or oils and more specifically oleic, linoleic, linolenic and erucic acid are also contemplated.

Amont the starting amides, particular attention may be paid to secondary amides wherein $R^4$ is an alkyl radical of 1-5 carbon atoms and $R^5$ an alkyl radical of 1-12 carbon atoms and, by way of example, N-methyl acetamide, N-methyl butyramide or N-methyl lauramide of the formula $C_{11}H_{23}$—CO—NH—$CH_3$.

The operating conditions disclosed in the French Pat. No. 2 395 252 for the preparation of N-acyl α-amino carboxylic compounds may vary to a large extent. For example, the total pressure may range from 10 to 250 bars and preferably from 30 to 200 bars. The ratio $H_2/CO$ is for example from 5:1 to 1:10 and preferably from 1:2 to 1:5 by mole. It is generally preferred to limit the value of the $H_2/CO$ ratio in order to avoid alcohol formation. It is however possible to proceed with a ratio of, for example, 2:1, preferably at a lower temperature. The usual temperatures are 50°-200° C., preferably 90°-150° C.

It may be observed that, in this process, the preparation of the compounds wherein $R^4$ is an alkyl radical (by use of a secondary amide) results in a lower formation of by-products than that of compounds wherein $R_4$ is a hydrogen atom (by use of a primary amide). The compounds considered in this invention hence provide an improved yield.

The resultant product is sometimes accompanied with unreacted products. It is easy to separate the olefin from the acylated amino-acid, either by evaporating the olefin or by extraction after solvent evaporation. The solvents used for extracting olefins are generally saturated or unsaturated hydrocarbons. The acylated amino-acids may also be neutralized by means for example of sodium hydroxide or potassium hydroxide; the acylated amino-acid then passes into the aqueous phase as a sodium or potassium salt.

The acylated derivative of the amino-acid is often insoluble in the aqueous phase. This gives the possibility of separating cobalt which may be dissolved in the aqueous phase with or without prior acidification. Inorganic or organic acids can be used. Some acids give precipitates in organic phases.

According to the invention, the N-acyl N-alkyl α-amino carboxylic compounds, such as above-defined, are used as surfactants in micellar systems of various compositions. They can be used as pure products or as previously formed aqueous solutions, such solutions having for example a 10-40% by weight concentration of active substance.

These surfactants can be used according to the invention jointly with other products which will be referred to hereinafter as "co-surfactants" or "co-solvents". They are mainly alcohols, particularly primary aliphatic monoalcohols of 1-12 carbon atoms, and advantageously are: n-1 propanol, isopropanol, n-1-butanol, isobutanol, n-1-pentanol, n-1-hexanol, n-1-heptanol, n-1-octanol, n-1-decanol, n-1-dodecanol, used separately or as intermixtures.

The effect of the length of the alkyl chains in the various monoalcohols has already been determined with other surfactants. At high salt concentrations, the optimum solubilization parameter (such as hereinafter defined) is higher when using heavy alcohols ($C_{10}-C_{18}$) instead of light alcohols ($\leq C_6$) (c f. BAVIERE, M. "Alcohol Molecular Weight Effect on the Phase Behaviour of Micellar Systems". Fourth International Conference on Surface and Colloid Science, Jerusalem, Israel, July 1981).

It is still possible to use, as co-surfactants, amines, acids, ethers, polyols, and non-ionic surfactants such as fatty alcohol, fatty acid, or alkylphenol ethoxylates, or even anionic surfactants such as compounds having sulfate, sulfonate, carboxylate or phosphonate groups. These various co-surfactants may be used alone or as mixtures.

The micellar systems considered in this invention may consist of aqueous solutions having various concentrations of surface-active products, for example from 0.1 to 15% by weight or more.

In these solutions, a co-surfactant or a co-solvent, as precedingly defined, may be further introduced in a proportion of, for example, up to 15% by weight with respect to the total weight of the solution.

The N-acyl N-alkyl α-amino carboxylic compound and the co-surfactant or co-solvent may be used in various ratios to each other; advantageously the ratio by weight of the co-surfactant or of the co-solvent to the surfactant will range from 0 to 5/1; it is more preferably from 1/1 to 3/1.

The water used to prepare these solutions may contain mono-and/or polyvalent cations, particularly $Na^+$, $K^+$, $Ca^{++}$, or $Mg^{++}$ (the total salt concentration being for example from 30 to 300 g/l). The water may originate from the field. The water proportion ranges from 70 to 99.9% by weight.

The micellar systems considered in the invention may further contain at least one hydrocarbon liquid, the constituents being then in such proportions that they form together a micro-emulsion (one-phase system).

In these systems, the hydrocarbon liquid may be a pure hydrocarbon, containing for example 8-16 carbon atoms, a hydrocarbon mixture, a fractionation oil cut or even a crude oil. The total of the water (optionally salted) and the hydrocarbon liquid generally amounts to 70-99.9% by weight of the micro-emulsion, the ratio by weight of the hydrocarbon liquid to water ranging for example from about 1/100 to 4/1. This ratio is preferably from 1/20 to 1/1. Depending on this ratio, the micro-emulsion may be of the water-in-oil type or of oil-in-water type. The concentrations of surfactant and co-surfactant or co-solvent are the same as precedingly. For enhanced oil recovery, the so-defined micellar systems are injected in the field. Generally, a subsequent injection of a solution of hydrosoluble polymer, followed with a water injection, is performed.

tion parameters of oil (hydrocarbon) and of water. This common value (SP*) is determined in ml/ml.

The surfactant concentration in proportion to all the constituents of the system is 1% by weight of active substances and that of the "cosolvent" (monoalcohol) is 3% by weight.

The determinations may be performed at various temperatures, which will be mentioned.

EXAMPLES 1 TO 4

In these examples, a mixture of sodium N-acetyl N-methyl α-amino alkanoates derived from a $C_{20}$–$C_{24}$ α-olefins cut ($C_{22}$–$C_{26}$ amino-acids) is used. The aqueous component is a sodium chloride brine and the hydrocarbon is n-dodecane.

The results obtained with various alcohols at three different temperatures are indicated in Table I hereinafter.

TABLE I

| | Example | | | | | | | |
|---|---|---|---|---|---|---|---|---|
| | 1 | | 2 | | 3 | | 4 | |
| | Alcohol | | | | | | | |
| Temperature | n-1-hexanol | | n-1-pentanol | | n-1-butanol | | n-1-propanol | |
| (°C.) | S* | SP* | S* | SP* | S* | SP* | S* | SP* |
| 25 | 34 | 46 | 54 | 19 | 103 | 7 | 224 | 7 |
| 50 | 36 | 41 | 52 | 14 | 91 | 9 | 156 | 6 |
| 80 | 37 | 30 | 49 | 11 | 80 | 9 | 136 | 7 |

EXAMPLES 5 TO 11

In these examples, the surface active compound according to the invention is sodium N-acetyl N-methyl α-amino alkanoate obtained from 1-dodecene. As in the preceding examples, the aqueous phase consists of a sodium chloride brine and the hydrocarbon is n-dodecane. The temperature is 50° C.

Table II below indicates the values of the optimum salt content and of the solubilization parameter, determined for various primary alcohols with a linear alkyl chain.

TABLE II

| Example | 5 | 6 | 7 | 8 | 9 | 10 | 11 |
|---|---|---|---|---|---|---|---|
| Alcohol | butanol | pentanol | hexanol | heptanol | octanol | decanol | dodecanol |
| S* | 245 | 225 | 202 | 170 | 160 | 177 | 204 |
| SP* | 2.2 | 3.2 | 3.7 | 6.4 | 9.5 | 14.8 | 21.0 |

EXAMPLES

The following examples mainly show that the surfactants according to the invention are particularly convenient for use in the preparation of micellar systems for enhanced oil recovery.

EXAMPLES 1 TO 13

These examples concern the preparation of three-phase systems from water of variable salt content, a hydrocarbon used in a ratio by weight to water arbitrarily set at 1/1, and a surfactant (and co-surfactant or co-solvent), the surfactant being used in an insufficient proportion to result in the formation of a single micellar phase (micro-emulsion). It is then possible to determine the "optimum salt content" (noted S*) corresponding to the optimum solubilization parameter (noted SP*). The solubilization parameter is defined as the hydrocarbon volume (respectively the water volume) solubilized by the micellar phase in proportion to the surfactant volume. The optimum salt content (S*), expressed in g/l, corresponds to respective equal values of the solubiliza- These results make apparent that S* does not vary regularly in proportion to the alcohol molecular weight. A particularly high value of SP* at high salt contents is observed with heavy alcohols ($C_{10}$ and $C_{12}$) as compared with lighter alcohols ($C_4$, $C_5$ and $C_6$).

EXAMPLE 12

In this example, the surfactant is the same as in examples 5 to 11.

The aqueous phase is also a sodium chloride brine, but the hydrocarbon is n-pentane.

The alcohol is n-1-hexanol and the temperature is 25° C. Found values were:

S* = 120 g/l
SP* = 11 ml/ml

EXAMPLE 13

The surfactant is the same as in examples 5 to 12. The aqueous phase is a sodium chloride and calcium chloride brine (in a ratio by weight NaCl/CaCl$_2$ of 9/1).

The hydrocarbon is toluene and the alcohol is n-1-hexanol.

The determined values of the optimum salt content and of the optimum solubilization parameter are:
S* = 26 g/l
SP* = 13 ml/ml.

EXAMPLE 14 (COMPARATIVE)

Example 23 of the French Pat. No. 2 440 773 is repeated with the use of sodium N-acetyl α-amino tetradecanoate.

The brine contains sodium chloride and calcium chloride in a ratio by weight NaCl/CaCl$_2$ of 5/1. It is used in a proportion of 51 g/l. This value has been so calculated as to take into account the dilution of the 60 g/l brine used in example 23 of said above-mentioned French patent with the water content of the surfactant solution. The hydrocarbon is n-dodecane, the alcohol is n-1-pentanol and the ratio by weight surfactant/alcohol is 1/1.

The composition of the microemulsion containing, at 20° C., a minimum amount of surfactant, is determined. This composition is given in table III.

EXAMPLE 15

Example 14 is repeated by replacing sodium N-acetyl α-amino tetradecanoate by sodium N-acetyl N-methyl α-amino tetradecanoate.

Under the same conditions, the minimum proportion of surfactant giving rise to a single phase (microemulsion) is determined. The corresponding composition is also indicated in table III.

TABLE III

|  |  | Example | |
|---|---|---|---|
|  |  | 14 | 15 |
| Brine | % by weight | 40.72 | 41.30 |
| n-dodecane | % by weight | 34.80 | 35.30 |
| n-1-pentanol | % by weight | 12.24 | 11.70 |
| Surfactant | % by weight | 12.24 | 11.70 |
| Water/hydrocarbon | (ratio b.w.) | 1.17 | 1.17 |

This table shows that in example 15, according to the invention, a saving of surfactant (also of alcohol) of 0.54% is obtained, which corresponds to a decrease of 4.4% as compared to the prior art (example 14). In proportion to the solubilized water (or hydrocarbon) amount, this saving amounts to 6.1%.

EXAMPLE 16 (COMPARATIVE)

Example 28 of the French Pat. No. 2 440 773 is repeated with the use of sodium N-acetyl α-amino tetradecanoate. The brine contains 88.3 g/l of sodium chloride and calcium chloride in a proportion by weight NaCl/CaCl$_2$ of 5/1. The brine concentration has been so calculated as to take into account the dilution of the brine at 120 g/l used in example 28 of the above-mentioned French patent, by the water contained in the surfactant solution.

The hydrocarbon is n-dodecane. The alcohol is n-1-pentanol and the ratio by weight of the surfactant to the alcohol is 1/1.

The composition of the microemulsion containing, at 20° C., a minimum of surfactant is determined.

This composition is given in Table IV.

EXAMPLE 17

Example 16 is repeated except that sodium N-acetyl α-amino tetradecanoate is replaced by sodium N-acetyl N-methyl α-amino tetradecanoate.

Under the same conditions the minimum proportion of surfactant giving rise to a single phase (microemulsion) is determined. The corresponding composition is also indicated in table IV.

TABLE IV

|  |  | Example | |
|---|---|---|---|
|  |  | 16 | 17 |
| Brine | % by weight | 35.60 | 36.85 |
| n-dodecane | % by weight | 26.80 | 27.75 |
| n-1-pentanol | % by weight | 18.80 | 17.70 |
| Surfactant | % by weight | 18.80 | 17.70 |
| Water/hydrocarbon | (ratio b.w.) | 1.33 | 1.33 |

The table shows that, in example 17 according to the invention, a saving of surfactant (and of alcohol) of 1.1% is achieved, which corresponds to an improvement of 5.85% with respect to the prior art (example 16). This saving, expressed in proportion of the solubilized water (or hydrocarbon) amounts to 9.9%, i.e. a particularly substantial value.

EXAMPLE 18

The operating conditions are close to those of an oil field, the model for oil being here n-decane.

The brine comprises water and the following inorganic salts:
M$^1$Cl: 22.0 g/l with M$^1$=Na and K
M$^2$Cl$_2$: 4.8 g/l with M$^2$=Ca and Mg.

The microemulsion obtained at 43° C. has the following composition (expressed in % by weight):

| Brine | 47 |
|---|---|
| n-decane | 47 |
| isobutanol - isopropanol mixture (60–40% by weight) | 3 |
| Surfactant (that of examples 1 to 4) | 3 |

Here, the solubilization parameter is at least 15.67 ml/ml.

EXAMPLES 19 TO 21

The interfacial tension of various triphasic systems at the optimum has been measured by the spinning-drop method.

Table V below gives the measured values for various salt contents of a brine containing sodium chloride and for various surface-active compounds according to the invention:
sodium N-acetyl N-methyl α-amino octadecanoate (example 19)
sodium N-acetyl N-methyl α-amino hexadecanoate (example 20)
sodium N-acetyl N-methyl α-amino tetradecanoate (example 21).

The reported values are those of the interfacial tension between the upper phase and the intermediary phase (up.-int.) and between the intermediary phase and the lower phase (int.-low.).

TABLE V

| Salt content g/l NaCl | Interface | Interfacial tension (mN/m) | | |
|---|---|---|---|---|
| | | Example 19 | Example 20 | Example 21 |
| 45 | Up.-Int. | $7 \times 10^{-3}$ | $2.5 \times 10^{-3}$ | |
| | Int.-low. | $4 \times 10^{-3}$ | $4 \times 10^{-3}$ | |
| 60 | Up.-Int. | | $8 \times 10^{-3}$ | $1.5 \times 10^{-3}$ |
| | Int.-Low. | | $11 \times 10^{-3}$ | $17 \times 10^{-3}$ |
| 75 | Up.-Int. | | $14 \times 10^{-3}$ | |
| | Int.-Low. | | $25 \times 10^{-3}$ | |
| 120 | Up.-Int. | | | $36 \times 10^{-3}$ |
| | Int.-low. | | | $56 \times 10^{-3}$ |

As shown in this table, the interfacial tension values are relatively low.

EXAMPLES 22 TO 25

The interfacial tension of various triphasic systems at the optimum, wherein the brine contained sodium, potassium, calcium and magnesium chlorides, has also been measured.

The surfactants were the followings:
sodium N-acetyl N-methyl α-amino octadecanoate (example 22);
sodium N-acetyl N-methyl α-amino eicosanoate (example 23);
Mixture (50—50) of sodium N-acetyl N-methyl α-amino octadecanoate and sodium N-acetyl N-methyl α-amino alkanoates deriving from a $C_{20}$–$C_{24}$ olefins cut ($C_{22}$–$C_{26}$ acids) (example 24);
mixture of sodium N-acetyl N-methyl α-amino alkanoates deriving from a $C_{20}$–$C_{24}$ olefin cut($C_{22}$–$C_{26}$ acids) (example 25).

The operation was conducted under the conditions and with the constituents indicated in table VI hereinafter. The values of the interfacial tensions are given in this table.

TABLE VI

| | Example | | | |
|---|---|---|---|---|
| | 22 | 23 | 24 | 25 |
| Temperature | 43° C. | 25° C. | 43° C. | 25° C. |
| Water salt content g/l | 22.0 (NaCl + KCl) 4.8 (CaCl$_2$ + MgCl$_2$) | 14.4(NaCl) 1.6(CaCl$_2$) | 22.0 (NaCl + KCl) 4.8 (CaCl$_2$ + MgCl$_2$) | 18(NaCl) 2(CaCl$_2$) |
| Hydrocarbon | n-decane | n-dodecane | n-decane | n-heptane |
| Water/hydrocarbon ratio | 1 | 1 | 1 | 1 |
| Alcohol | n-1-hexanol 10% n-1-pentanol 90% | n-1-pentanol | isobutanol | sec-butanol |
| Alcohol % b.w. | 3 | 3 | 3 | 7.5 |
| Surfactant % by weight | 3 | 1 | 3 | 1 |
| Interfacial tension(mN/m) | | | | |
| Up. Int. | $2 \times 10^{-3}$ | $2 \times 10^{-3}$ | $.2 \times 10^{-3}$ | $1 \times 10^{-3}$ |
| Int. Low | $3 \times 10^{-3}$ | $4 \times 10^{-3}$ | $1.5 \times 10^{-3}$ | $2 \times 10^{-3}$ |

In the following examples 26 to 28, the stability to hydrolysis of micellar systems wherein the surface-active compound was sodium N-acetyl N-methyl α-amino tetradecanoate has been tested in relation with the pH and the temperature.

EXAMPLE 26

The micellar system consists of an aqueous solution of sodium N-acetyl N-methyl α-amino tetradecanoate at a 2% concentration of active matter. After three months at a pH of 9 and at 80° C., no modification of the physico-chemical properties of the solution (substantial lowering of the interfacial tensions and capacity to form a microemulsion) was observed.

EXAMPLE 27

The aqueous solution further contains 3% by weight of n-1-butanol. Here also, no instability of the solution was observed after more than 4 months at 25°, 50° and 80° C. and at a pH of 7 and 9.

EXAMPLE 28

A triphasic system is formed with:
48% by weight of brine containing 300 g/l of NaCl and of CaCl$_2$ (NaCl/CaCl$_2$ ratio by weight of 9/1);
48% by weight of n-dodecane;
1% by weight of surfactant; and
3% by weight of n-1-butanol.

No variation of the physico-chemical properties (interfacial tension, solubilization parameters) were observed after more than 4 months at 25°, 50° and 80° C. and at pH values of 5, 7 and 9.

What is claimed as the invention is:

1. In a microemulsion comprising water, at least one hydrocarbon liquid and at least one surface-active compound, the improvement wherein said at least one surface-active compound is selected from N-acyl N-alkyl α-amino carboxylic compounds complying with the general formulas:

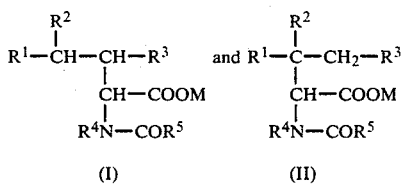

wherein at least one of the symbols $R^1$, $R^2$ and $R^3$ represents a saturated or unsaturated aliphatic hydrocarbon radical having from 1 to 22 carbon atoms, one of $R^1$, $R^2$ or $R^3$ optionally comprising a carboxylic group COOM, the one or more remaining symbols representing a hydrogen atom, $R^1$, $R^2$ and $R^3$ containing together from 10 to 22 carbon atoms, $R^4$ is methyl, $R^5$ is methyl and M is an alkali or alkaline-earth metal, ammonium or a quaternary ammonium group, and wherein the water contains alkali metal cations selected from the group consisting of Na$^+$ and K$^+$ and/or alkaline earth cations selected from the group consisting of Ca$^{2+}$ and Mg$^{2+}$, ammonium in amounts such that the total salt content ranges from 30 to 300 g/l, and wherein said microemulsion contains at least one alcohol cosolvent or cosurfactant.

2. A microemulsion according to claim 1 wherein $R^1$, $R^2$ and $R^3$ contain together 10 carbon atoms.

3. A microemulsion according to claim 1, wherein the surface-active compound is selected from sodium N-acyl N-alkyl α-amino tetradecanoate, hexadecanoate, octadecanoate, eicosanoate, docosanoate, tetracosanoate and hexacosanoate and their mixtures.

4. A microemulsion according to claim 3, wherein the surface-active compound is sodium N-acetyl N-methyl α-amino tetradecanoate.

5. A microemulsion according to claim 1, comprising 70–99.9% by weight of water and at least one hydrocarbon liquid, in a porportion by weight hydrocarbon liquid/water of about 1/100 to 4/1, 0.1–15% by weight of N-acyl N-alkyl α-amino carboxylic compound and less than 15% by weight of said alcohol cosurfactant or cosolvent.

6. A microemulsion according to claim 5, characterized in that the ratio by weight hydrocarbon liquid/water is about from 1/20 to 1/1.

7. A microemulsion according to claim 5, wherein said alcohol cosurfactant or cosolvent consists of at least one primary aliphatic monoalcohol having 1 to 12 carbon atoms.

8. A microemulsion according to claim 5, wherein the cosurfactant and the N-acyl N-alkyl α-amino carboxylic compound are used in a ratio by weight from 1/1 to 3/1.

9. In a process for the recovery of oil by injecting a microemulsion comprising water, at least one hydrocarbon liquid and at least one surface-active compound in an oil-containing reservoir, the improvement wherein said at least one surface-active compound is selected from N-acyl N-alkyl α-amino carboxylic compounds complying with the general formulas:

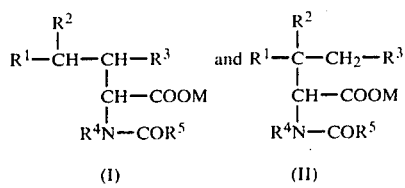

wherein at least on of the symbols $R^1$, $R^2$ and $R^3$ represent a saturated or unsaturated aliphatic hydrocarbon radical having from 1 to 22 carbon atoms, one of $R^1$, $R^2$ or $R^3$ optionally comprising a carboxylic group COOM, the one or more remaining symbols representing a hydrogen atom, $R^1$, $R^2$ and $R^3$ containing together from 10 to 22 carbon atoms, $R^4$ is methyl, $R^5$ is methyl and M is an alkali or alkaline-earth metal, ammonium or a quaternary ammonium group, and wherein the water contains alkali cations selected from the group consisting of $Na^{30}$ and $K^+$ and/or alkaline earth cations selected from the group consisting of $Ca^{2+}$ and $Mg^{2+}$, in amounts such that the total salt content ranges from 30 to 300 g/l, and wherein said microemulsion contains at least one alcohol cosolvent or cosurfactant.

* * * * *